United States Patent
Shan et al.

(10) Patent No.: US 10,929,029 B2
(45) Date of Patent: *Feb. 23, 2021

(54) MEMORY CONTROLLER AND METHOD FOR ACCESSING MEMORY MODULES AND PROCESSING SUB-MODULES

(71) Applicant: MONTAGE TECHNOLOGY CO., LTD., Shanghai (CN)

(72) Inventors: Gang Shan, Shanghai (CN); Howard Chonghe Yang, Shanghai (CN); Yi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,542

(22) Filed: Jan. 4, 2019

(65) Prior Publication Data
US 2019/0205048 A1 Jul. 4, 2019

(30) Foreign Application Priority Data

Jan. 4, 2018 (CN) .......................... 201810008762.4
Jan. 8, 2018 (CN) .......................... 201810015105.2
Aug. 15, 2018 (CN) .......................... 201810928985.2

(51) Int. Cl.
*G06F 3/00* (2006.01)
*G06F 3/06* (2006.01)
*G06F 12/08* (2016.01)

(52) U.S. Cl.
CPC .......... *G06F 3/0622* (2013.01); *G06F 3/0629* (2013.01); *G06F 3/0659* (2013.01); *G06F 3/0673* (2013.01); *G06F 12/08* (2013.01)

(58) Field of Classification Search
CPC .... G06F 3/0622; G06F 3/0629; G06F 3/0659; G06F 3/0673; G06F 12/08
See application file for complete search history.

(56) References Cited

U.S. PATENT DOCUMENTS 10,389,659 B2 * 8/2019 Janhar ..................... H04L 69/04
2005/0108469 A1 * 5/2005 Freeman ................. G06F 13/16
711/105

(Continued)

FOREIGN PATENT DOCUMENTS

CN 1902612 A 1/2007
CN 105868125 A 8/2016

(Continued)

OTHER PUBLICATIONS

The First Office Action in Chinese Patent Application No. 201810015105.2, dated Jun. 9, 2020.

(Continued)

*Primary Examiner* — Tammara R Peyton
(74) *Attorney, Agent, or Firm* — Jun He Law Offices P.C.; James J. Zhu (57) ABSTRACT

A memory controller and a method for accessing a memory module are provided. The memory controller is coupled between the memory module and a host controller to control the access of the host controller to the memory module. The memory controller comprises: a central buffer coupled to the host controller for receiving a data access command from the host controller, and coupled to the memory module for providing a modified data access command to the memory module; wherein the central buffer comprises an access command processing module, for processing the data access command to generate the modified data access command; and a data buffer coupled to the central buffer for receiving the modified data access command from the central buffer, and coupled between the host controller and the memory module for exchanging data between the host controller and the memory module under the control of the modified data access command.

26 Claims, 6 Drawing Sheets

(56) References Cited

U.S. PATENT DOCUMENTS

| | | | |
|---|---|---|---|
| 2005/0259954 A1 | 11/2005 | Ando et al. | |
| 2012/0324156 A1* | 12/2012 | Muralimanohar | G06F 11/10 |
| | | | 711/104 |
| 2013/0073815 A1 | 3/2013 | Shea | |
| 2013/0304970 A1* | 11/2013 | Parizi | G06F 3/0619 |
| | | | 711/103 |
| 2016/0132269 A1 | 5/2016 | Nale | |
| 2017/0075622 A1* | 3/2017 | Kwon | G06F 3/0647 |
| 2018/0350412 A1* | 12/2018 | Lee | H03M 9/00 |

FOREIGN PATENT DOCUMENTS

| | | |
|---|---|---|
| CN | 106126447 A | 11/2016 |
| CN | 106155926 A | 11/2016 |
| CN | 106295381 A | 1/2017 |
| CN | 110007850 A | 7/2019 |
| EP | 1536311 A1 | 6/2005 |

OTHER PUBLICATIONS

The Second Office Action in Chinese Patent Application No. 201810015105.2, dated Aug. 31, 2020.
The Second Office Action in Chinese Patent Application No. 201810928985.2, dated Aug. 31, 2020.

* cited by examiner

MEMORY CONTROLLER AND METHOD FOR ACCESSING MEMORY MODULES AND PROCESSING SUB-MODULES

CROSS REFERENCE TO RELATED APPLICATIONS

This application is based on and claims priority to Chinese Patent Application No. 201810015105.2 filed on Jan. 8, 2018, Chinese Patent Application No. 201810008762.4 filed on Jan. 4, 2018 and Chinese Patent Application No. 201810928985.2 filed on Aug. 15, 2018, the entire content of which is incorporated herein by reference.

TECHNICAL FIELD

The application generally relates to memory technology, and more particularly to a memory controller and a method for accessing a memory module.

BACKGROUND

In an existing computer system, a memory module group provides data access and storage during computations of a central processing unit (CPU). With the continuous increase of the read speed, in order to ensure the signal transmission quality between the CPU and the memory module group, the memory module group may use a controller chip with a buffering function to buffer operation commands sent from the CPU and the corresponding memory addresses, and the memory module group further comprises a data buffer that can bidirectionally buffer data.

However, the operation mode of the existing memory module group is relatively simple, and only supports simple operations such as reading and writing, which limits the functions of the memory module group. Therefore, it is necessary to improve the data access method of the existing memory module group.

SUMMARY

One objective of the application is to provide a memory controller and a method for accessing a memory module, which can implement complex data access operations.

According to one aspect of the application, a memory controller is provided. The memory controller is coupled between a memory module and a host controller to control access of the host controller to the memory module. The memory controller comprises: a central buffer coupled to the host controller for receiving a data access command from the host controller, and coupled to the memory module for providing a modified data access command to the memory module; wherein the central buffer comprises an access command processing module configured for processing the data access command to generate the modified data access command; and a data buffer coupled to the central buffer for receiving the modified data access command from the central buffer, and coupled between the host controller and the memory module for exchanging data between the host controller and the memory module under the control of the modified data access command.

In some embodiments, processing the data access command via the access command processing module comprises: encoding an access address in the data access command such that the modified data access command includes an encoded access address.

In some embodiments, processing the data access command via the access command processing module comprises: processing an access address in the data access command with a predefined address processing algorithm to generate a set of access addresses based on the access address, wherein each access address in the set of access addresses corresponds to a modified data access command.

In some embodiments, the set of access addresses comprises multiple consecutive access addresses in an ascending or descending order.

In some embodiments, the set of access addresses comprises multiple nonconsecutive access addresses at equal intervals or at unequal intervals.

In some embodiments, the modified data access command is of an access type identical to that of the data access command.

In some embodiments, the data buffer comprises a data processing module configured for receiving data from the host controller or the memory module, processing the data with a predefined data processing algorithm, and sending the processed data to the host controller or the memory module.

In some embodiments, the data buffer comprises a data processing module configured for receiving data from the memory module, processing the data with a predefined data processing algorithm, and sending the processed data to the memory module.

In some embodiments, processing the data access command via the access command processing module comprises: processing an access address in the data access command with a predefined address processing algorithm to generate a set of access addresses based on the access address, wherein each access address in the set of access addresses corresponds to a modified data access command; the data buffer comprises a data processing module configured for receiving data from the memory module according to the modified data access command, processing the data with a predefined data processing algorithm, and sending the processed data to the memory module according to the modified data access command.

In some embodiments, the data buffer comprises multiple data buffer units, each of the data buffer units corresponding to a data processing sub-module, wherein the multiple data processing sub-modules are coupled to each other to exchange data between the multiple data buffer units.

In some embodiments, the memory module and the memory controller are in accordance with the JEDEC DDR SDRAM standard, the central buffer is integrated in a registering clock driver, and the registering clock driver is coupled to the data buffer via a data buffer control bus.

According to another aspect of the application, a memory device is provided. The memory device comprises the memory controller and the memory module of the abovementioned aspect. A computer system is further provided. The computer system comprises the memory device of the abovementioned aspect.

According to another aspect of the application, a method for accessing a memory module is provided. The memory module is coupled to a host controller via a memory controller, and the memory controller comprises a data buffer and a central buffer, the central buffer comprising an access command processing module, wherein the access command processing module is configured for processing a data access command to generate a modified data access command; the method comprises: receiving, via the central buffer, a data access command; processing, via the central buffer, the data access command to generate a modified data access command; providing, via the central buffer, the modified data access command to the memory module and the data buffer; exchanging, via the data buffer, data between the host controller and the memory module according to the modified data access command.

The foregoing is a summary of the present application, may be simplified or generalized, and some details may be omitted. Thus, it should be appreciated by those skilled in the art that this part is only exemplary and illustrative, but is not intended to limit the scope of the present application in any ways. This summary part is neither intended to determine the key features or necessary features of the subject sought to be protected, nor intended to be used as a supplementary means for determining the scope of the subject sought to be protected.

BRIEF DESCRIPTION OF THE DRAWINGS

The aforementioned features and other features of the present application will be fully understood via the following specification and the appended claims in combination with the accompanying drawings. It can be understood that, these accompanying drawings merely illustrate certain embodiments in accordance with the present application and should not be considered as limitation to the scope of the present application. By using the accompanying drawings, the content of the present application will be described more explicitly and detailedly.

DETAILED DESCRIPTION

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without departing from the spirit and scope of the application. It can be understood that, the various aspects of the application described and graphically presented herein may be arranged, replaced, combined, divided and designed in many different configurations, and these different configurations are explicitly incorporated in the application.

Figure 1A:
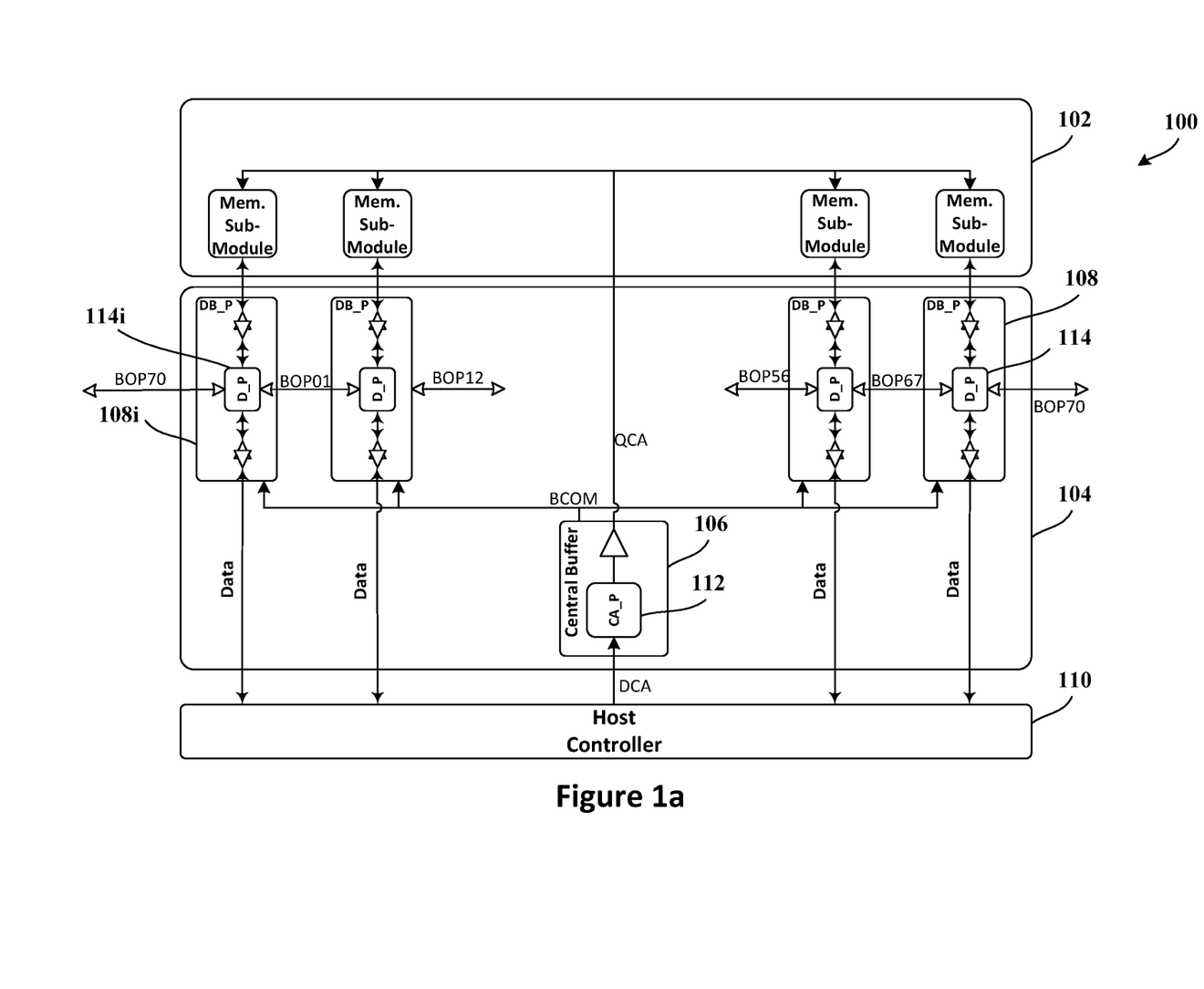
FIG. 1a shows a memory system 100 according to an embodiment of the application.

FIG. 1a shows a memory system 100 according to an embodiment of the application.

As shown in FIG. 1a, the memory system 100 comprises a memory module 102 which is configured as a memory module group in the present embodiment, for storing data. In the embodiment shown in FIG. 1a, the memory module 102 has a plurality of memory submodules (denoted as "Mem. Sub-Module"). In some embodiments, the memory module 102 may be a memory module in accordance with the JEDEC Double Data Rate (DDR) Synchronous Dynamic Random Access Memory (SDRAM) standard, including, for example, the JEDEC DDR, DDR2, DDR3, DDR4, DDR5 and other DDR standards. Moreover, the memory module 102 can be an internal memory in accordance with other standards or protocols, e.g. a SDRAM or RAMBUS internal memory, or any other memories in accordance with future memory standards or protocols. In some embodiments, the memory module 102 may comprise a volatile memory (e.g., RAM), a non-volatile memory (e.g., NAND or NOR flash memory) or a combination thereof. In some other embodiments, the memory module 102 may be new types of memories manufactured using other processes, including but not limited to, a magnetoresistive memory, a phase change memory, a resistive memory, a semi-floating gate memory or any other types of memories. It can be appreciated that the memory module 102 may be consisted of a single type of memory, or may include multiple or all of the aforementioned or other types of memories, or include more other types of memories, It should be noted that, the memory module 102 herein can be a memory chip of a single die or a memory chip of two or more dies. Furthermore, the memory array or memory dies included in the memory module 102 may have any suitable interconnected structure. For example, multiple memory dies may be connected in parallel to form a memory module, alternatively, multiple memory dies may be connected as a multi-level interconnected structure (e.g. two levels). For example, one or more memory dies may be used as a first memory level, and the other one or more memory dies may be used as a second memory level, thus providing different levels of memory. The lower second memory level may interchange data with exterior components of the memory module via the first memory level. A specific multi-level interconnected structure will be elaborated below.

As shown in FIG. 1a, the memory system 100 can further comprise a memory controller 104, and the memory controller 104 comprises a central buffer 106 and a data buffer (DB_P) 108. In particular, the central buffer 106 is coupled between a host controller 110 and the memory module 102, and can receive a data access command containing an access address and an access type from the host controller 110. For example, the data access command may be a command of accessing (e.g., reading or writing) a data storing address (i.e., the access address) in the memory module 102. The data buffer 108 is coupled between the memory module 102 and the host controller 110, for exchanging data between the memory module 102 and the host controller 110 under the control of the central buffer 106. For the memory system in accordance with the DDR3 or DDR4 standards, the central buffer can be integrated in a registering clock driver (RCD). Correspondingly, the central buffer 106 is coupled to the host controller 110 via a command/address (C/A) bus, e.g. a bus DCA shown in FIG. 1, to receive a data access command. For the memory system in accordance with the DDR4 standard, the C/A bus may comprise pins A0-A17, pins BG0-BG1 and/or pins BA0-BA1. The pins BG0-BG1 are for determining which memory bank group in the memory module 102 is to be processed, e.g. being written into or being read from. The pins BA0-BA1 are for determining which memory bank in the memory module 102 is to be processed, and the pins A0-A17 are for addressing and determining which memory unit in a memory bank is to be processed. Moreover, input to the three pins A16 (RAS_n), A15 (CAS_n) and A14 (WE_n) can be used for identifying an input data access command, such as a read command, a write command or other predefined control commands.

Different from the existing central buffers, the central buffer 106 has an access command processing module (CA_P) 112, which can be constructed as a module having data processing and operating ability. In some embodiments, the access command processing module 112 can be implemented by software, hardware, firmware or a combination thereof. For example, the access command processing module 112 can be an application specific integrated circuit or a field programmable logic array chip. The access command processing module 112 can process a data access command received from the host controller 110, so as to generate a modified data access command.

Moreover, the access command processing module 112 can provide the modified data access command to the memory module 102 and the data buffer 108, such that the two can continue performing data access operations according to the modified data access command. For example, the access command processing module 112 may provide the modified data access command and other control commands via the C/A bus QCA between the central buffer 106 and the memory module 102, and/or provide the modified data access command and other control commands via the data buffer control bus BCOM between the central buffer 106 and the data buffer 108. In some embodiments, the access command processing module 112 can generate one or more access addresses according to the access address contained in the data access command, and these access addresses can be provided to the memory module 102 for addressing during data accessing. For example, a C/A bus QCA is configured between the memory module 102 and the central buffer 106 for signal and command interaction therebetween. Meanwhile, the access command processing module 112 also generates a corresponding access type according to the access type of the data access command, such that the data buffer 108 can control the data exchange between the accessed memory unit in the memory module 102 and the host controller 110 according to the generated access type.

The access command processing module 112 can generate a modified data access command in any desired manner. In some embodiments, the access command processing module can encode an access address in the data access command, such that the modified data access command includes an encoded access address. In some other embodiments, the access command processing module may process an access address in the data access command with a predefined address processing algorithm, so as to generate a set of access addresses based on the original access address. Each access address of the newly generated set of access addresses can correspond to a modified data access command. Optionally, these modified data access commands may be of an access type identical to that of the original data access commands. For example, the data access command received from the host controller 110 may be a data access command for reading an access address in the memory module 102, so the newly generated modified data access command can be a data access command for reading multiple access addresses related to the access address. In some embodiments, a set of access addresses in the set of modified data access commands may include multiple consecutive access addresses in an ascending or descending order, wherein the set of access addresses can use a received access address as an initial address. As such, the host controller 110 only needs to provide one data access command to the memory controller 104 to access multiple memory units in the memory module 102, which significantly improves the efficiency of the data accessing. In some other embodiments, the set of access addresses may include multiple non-consecutive access addresses at equal intervals, wherein the interval can be 1, 2 or other natural numbers. In particular, for a memory array in the memory module 102, if the interval of the access address sequence corresponds to the row width of the memory array, the set of access addresses substantially corresponds to a column of memory units in the memory array (or at least a part of a column of memory units). For many vector-operations, this column-by-column access can significantly improve the operation efficiency. In some embodiments, the set of access addresses may include multiple non-consecutive access addresses at unequal intervals. The intervals between these access addresses can be configured according to the data required by actual vector-operations. In particular, for a memory array in the memory module 102, if the access address sequence corresponds to the memory units on a diagonal of the memory array, the set of access addresses substantially correspond to accessing the memory units on the diagonal of the memory array, and this data access method is beneficial to many types of vector-operations and other operations or calculations.

In some embodiments, the access command processing module 112 can encrypt an access address in a data access command with an encryption algorithm, such that the encrypted access address is different from the access address in plaintext. For example, a memory address of the encrypted data is different from a data memory address provided by the host controller. When it is required to read data from the memory module, the access address included in a read command can be decrypted by the access command processing module 112, such that the requested data can be read out from the corresponding location of the memory module.

In the embodiment shown by FIG. 1a, in addition to including the access command processing module 112 in the central buffer 106, a data processing module (D_P) 114 is included in the data buffer 108. The data processing module 114 can receive data from the host controller 110 and the memory module 102 to which it is coupled, process the received data with a predefined data processing algorithm, and then send the processed data to the host controller 110 and the memory module 102. In some embodiments, when the host controller 110 instructs to read data from the memory module 102, the data buffer 108 can buffer the data received from the memory module 102, and process the data via the data processing module 114. Thus, the data obtained by the host controller 110 are processed data. In some other embodiments, when the host controller 110 instructs to write data into the memory module 102, the data buffer 108 can also buffer data received from the host controller 110, process the data via the data processing module 114, and then write the data into the memory module 102. Thus, the data stored in the memory module 102 is processed data.

In some embodiments, the data processing module 114 can receive data from the memory module 102 and process the data, so as to send the processed data to the memory module 102. In other words, thanks to the data processing module 114 in the data buffer 108, data can be directly processed in the memory controller 104 without being transferred to the host controller 110, which significantly reduces the volume of the data exchanged between the host controller 110 and the memory module 102 and improves the data processing efficiency.

In some embodiments, the data processing performed by the data processing module 114 may include various bitwise operations. For example, these bitwise operations may include: bit-left-shift, bit-right-shift, bit-left-rotate, bit-right-rotate, bit-and, bit-or, bit-xor, bit-nxor, bit-clear, bit-set or other similar operations. In addition to the foregoing bitwise operations, the data processing module 114 can perform various types of data operations, such as XCHG (exchange), MOV (move), INC (increment), DEC (decrement) or other similar operations.

In some embodiments, the data processing module 114 may also perform an encryption/decryption process with an encryption/decryption algorithm to ensure the security of the data stored in the memory module and the security of the data transmission between the host controller and the memory module. The encryption/decryption process can be, for example, encrypting data when writing it into the memory module or decrypting data when reading it from the memory module.

In some embodiments, the data buffer 108 may comprise multiple data buffer units 108$i$, and each data buffer unit 108$i$ corresponds to a data processing sub-module 114$i$. In addition to being coupled in the path of the corresponding data buffer unit 108$i$, each different data processing sub-module 114$i$ is coupled to each other through bidirectional interfaces BOP (such as BOP01, BOP12 . . . BOP67 and BOP70 in FIG. 1$a$), so as to exchange data among the multiple data buffer units 108$i$. Exchanging data between different data buffer units 108$i$ can satisfy requirements of various operations, such as bit-shift, bit-rotate, INC, DEC and so on. In some embodiments, the BOP interfaces may have a two-wire bidirectional bus structure, including a clock line and a 1-bit bidirectional data line, and perform bidirectional data exchange through agreed protocols. In some other embodiments, the interfaces may have a three-wire bus structure, including a clock line, a transmission direction indication signal line, and a 1-bit bidirectional data line. The bandwidth of the BOP interfaces can be increased by increasing the number of bidirectional data lines.

The data processing module 114 can respond to an operation command provided by the central buffer 106. For example, the operation command may be transmitted through the data buffer control bus (BCOM) between the central buffer 106 and the data buffer 108. In some memory systems in accordance with the DDR4 standard, such as M88DDR4DB02 and M88DDR4RCD02 chips provided by Montage Technology (Shanghai) Co., Ltd. (technical information of these chips can be found in their data sheets, which are incorporated in their entirety by reference herein), the data buffer control bus can be 4-bit wide. Table 1 shows an example of the operation commands that can be provided via the BCOM bus.

TABLE 1

Operation Command List

| BCOM[3:0] Encoding (OP) | Operation Command |
| --- | --- |
| 0000 | Normal read |
| 0001 | Bit-left-shift |
| 0010 | Bit-right-shift |
| 0011 | Bit-left-rotate |
| 0100 | Bit-right-rotate |
| 0101 | Bit-and |
| 0110 | Bit-or |
| 0111 | Bit-xor |
| 1000 | Bit-nxor |
| 1001 | Bit-clear |
| 1010 | Bit-set |
| 1011 | XCHG |
| 1100 | MOV |
| 1101 | INC |
| 1110 | DEC |
| 1111 | RFU (Reserved for Future Use) |

Figure 2:
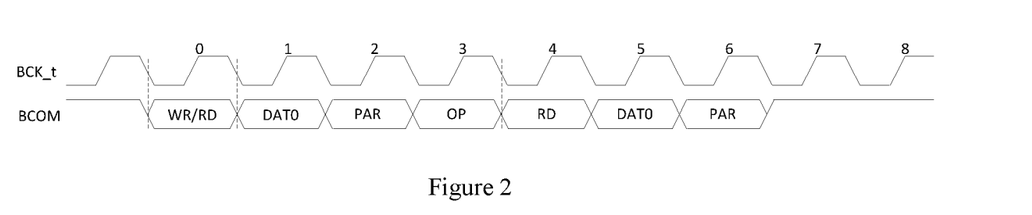
FIG. 2 shows an exemplary sequence diagram of a data processing operation instructed by a BCOM bus.

It should be noted that, in practical applications, each sub-module 114$i$ in the data processing module 114 can perform the same operation or perform different operations. FIG. 2 shows an exemplary timing diagram of a data processing operation instructed via the BCOM bus. BCK_t denotes a clock drive signal corresponding to the BCOM bus. As shown in FIG. 2, codes of OPs are added on the BCOM bus to indicate the corresponding data processing operations.

Those skilled in the art can understand that even though the embodiment shown in FIG. 1$a$ includes both the access command processing module 112 and the data processing module 114, the memory controller may only include one of them in practical applications. For example, the memory controller may only include the access command processing module 112 to generate a modified data access command, and the modified data access command can instruct the data buffer 108 not to process the data but to perform the normal operations such as read, write, etc. For another example, the memory controller may only include the data processing module 114 to process the buffered data as instructed by the central buffer via the BCOM bus.

It can be seen that, the memory controller 104 shown in FIG. 1$a$ can implement various complex data processing operations. These complex access operations performed by the access command processing module can be triggered in different ways according to different embodiments. In an embodiment, these complex access operations can be instructed by a bit in the command/address bus which is unused (or reserved) in the memory module specification. In some other embodiments, a trigger address (e.g., a memory address in the memory module) can be stored in the access command processing module in advance. When the central buffer receives a data access command including (or with) the trigger address, the complex access operation is triggered. In some other embodiments, whether to trigger a complex access operation can be indicated by inserting the corresponding code one clock cycle before the data access command of the memory module.

Figure 3:
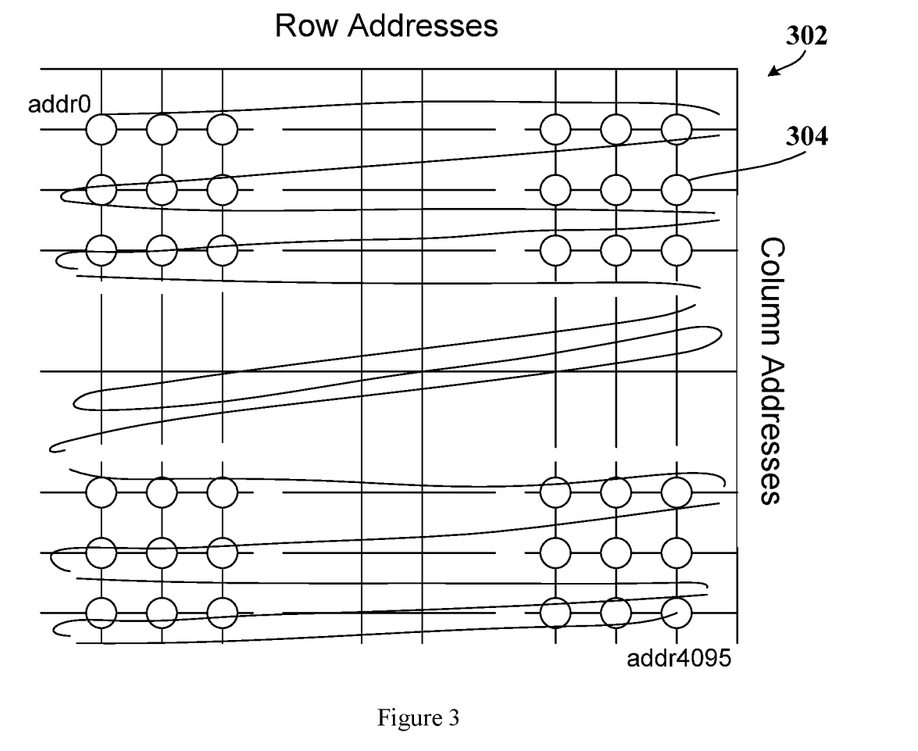
FIG. 3 shows an example of block operations using a memory controller according to an embodiment of the application.

FIG. 3 shows an example of using a memory controller for block operations according to an embodiment of the application. As shown in FIG. 3, a memory module includes a memory array 302, wherein memory units 304 of the memory array 302 are arranged in an array. In some embodiments, the memory array 302 may include multiple memory blocks, wherein each memory block may include, for example, 4096 memory units. The addresses of the memory units in the same memory block can be consecutive, for example, the addresses start at addr0 and end at addr4095.

For the memory array 302 shown in FIG. 3, complex block operations can be performed by using the memory controller in the embodiments of the application. Taking the "block-read" as an example, the host controller can send a data access command (read operation) to the memory controller, which includes the start address addr0 of the memory block. In response to the data access command, the memory controller can obtain the start address addr0 and generate a set of access addresses based on the start address addr0. The set of access addresses can include a total of 4096 access addresses from the start address addr0 to the end address addr4095. Based on the set of access addresses, the memory controller can generate 4096 modified data access commands, and these modified data access commands are sent to the memory module and the data buffer. Then, the data buffer correspondingly receives and buffers the data stored in these addresses, and provides the data to the host controller. It can be seen that, during the entire data reading process, the host controller only needs to provide one data access command to the memory controller to read the data of 4096 memory units in a block, which significantly improves data reading efficiency. It should be noted that, the number of the memory units accessed in the abovementioned block operation is merely exemplary. In practical applications, any number of memory units can be processed.

The abovementioned block-read operation does not use the data processing module in the data buffer. In some other embodiments, complex block operations can be performed using the data processing module either. For example, a "block-modify" operation can be performed on the memory block in the memory array shown in FIG. 3. In particular, the host controller can send a data access command (block-modify operation) to the memory controller, which includes the start address addr0 of the memory block. In response to the data access command, the memory controller can obtain the start address addr0 and generate a set of access addresses based on the start address addr0. The set of access addresses includes a total of 4096 access addresses from the start address to the end address addr4095. Based on the set of access addresses, the memory controller can generate 4096 data read commands, and these data read commands are sent to the memory module and the data buffer. Then, the data buffer correspondingly receives and buffers the data stored in these access addresses. Different from the foregoing block-read operation, the modified data access commands corresponding to the block-modify operation can also include an operation of instructing the data processing module in the data buffer to perform a relevant data processing operation (except for the foregoing data read operation). For example, the data processing operation can include a bit-and or bit-left-rotate operation on the read data, and a further operation to write the processed data back into the corresponding memory units (or continue buffering the processed data in the data buffer). It can be seen that, during the block-modify operation, the host controller only needs to provide a block-modify command to modify the data stored in all memory units in the whole block. It will be understood that, during the foregoing block-modify operation process, the data processed by the data processing module can also be provided to the host controller instead of being written back into the memory module.

Similar to the block-modify operation, the data processing module 114 can perform a read-process-write operation on a memory unit. In brief, the read-process-write operation refers to an operation that after the host controller initializes a read operation, data processing is performed on the read data out from the memory module according to requirements, and then the process data is directly written back into the memory module via the memory controller. In particular, after entering the "read-process-write" operation mode, data is read out from the memory module and temporarily stored in the corresponding data processing module or data buffer. Then, the access command processing module of the central buffer may notify the corresponding data processing module to perform, for example, a bit logic operation or a data operation, according a preset processing flow (see Table 1). After the bit logic operation or data operation is completed, the "read-process-write" operation is completed, and the access command processing module can control to write the data back to the memory module so as to complete the whole "read-process-write" operation.

Figure 4:
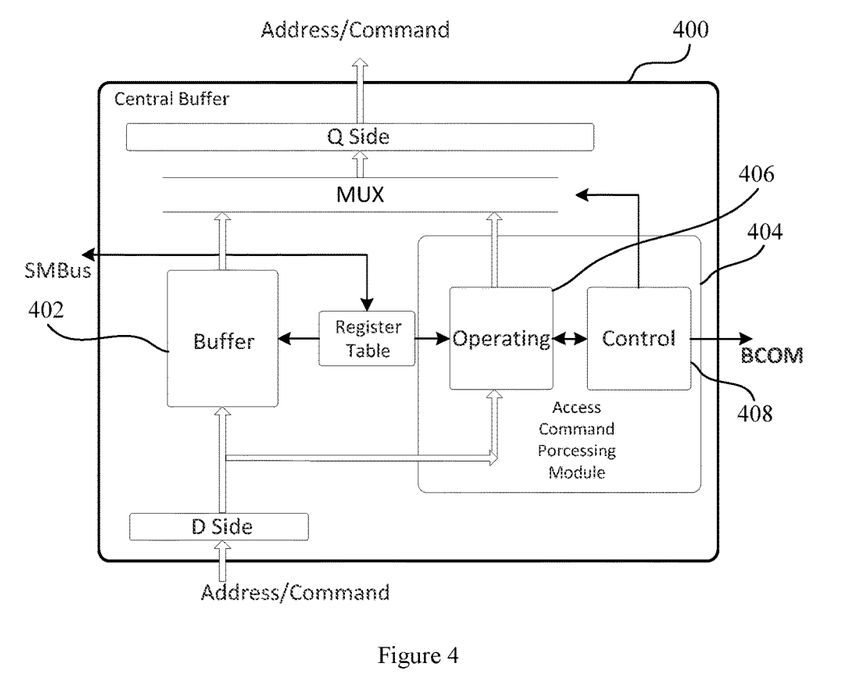
FIG. 4 shows an exemplary structure of a central buffer 400 according to an embodiment of the application.

FIG. 4 shows an exemplary structure of a central buffer 400 according to an embodiment of the application.

As shown in FIG. 4, the central buffer 400 comprises two signal paths coupled between a receiving side (D side) and an output side (Q side), being a buffer 402 and an access command processing module 404 respectively. For a path of the buffer 402, after receiving the data access command (CMD&ADDR) containing an access address and an access type, the buffer 402 does not perform additional process on the data access command but merely buffers this command and then outputs it from the output side. The access command processing module 404 comprises an operating module 406 and a control unit 408. After receiving the data access command sent from the host control module (not shown), the access command processing module 404 determines whether address processing and corresponding operation command generation, i.e., modifying the data access command, are needed based on a predefined triggering condition. After the triggering condition is satisfied, the access command processing module 404 modifies the command via the operating module 406, and generates a modified data access command. Then, the control unit 408 switches the output of the central buffer 400 from the output of the buffer 402 to the output of the access command processing module 404 through a multiplexer (MUX), and simultaneously sends a corresponding control signal to each data processing module (not shown in the figure) of the data buffer via the BCOM bus, so as to instruct these data processing modules to perform corresponding data processing operations.

In some embodiments, the buffer 402 and the access command processing module 404 can be configured with the configuration information stored in the register table, and the configuration information of the register table can be modified via the SMBus interface.

Figure 5:
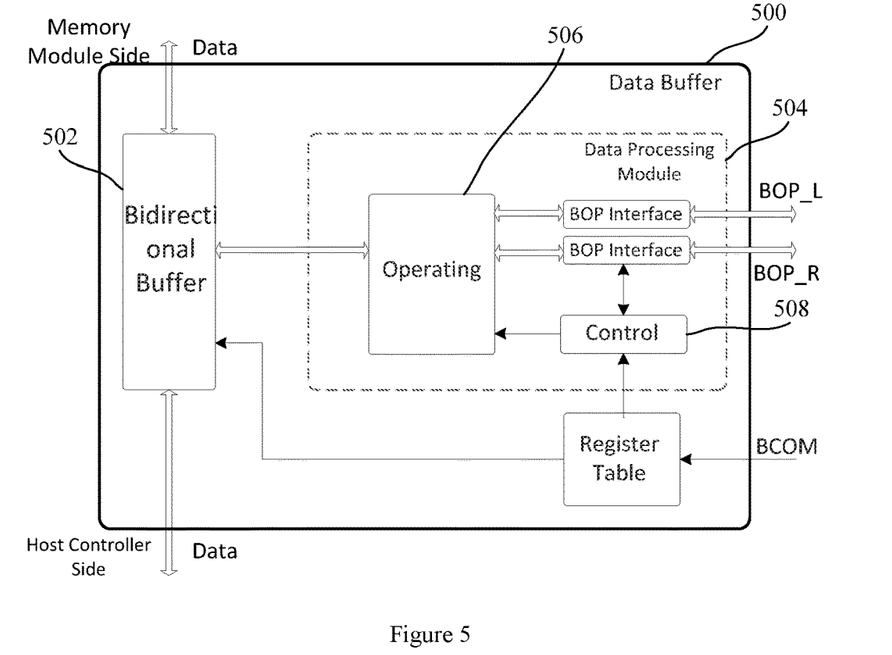
FIG. 5 shows an exemplary structure of a data buffer 500 according to an embodiment of the application

FIG. 5 shows an exemplary structure of a data buffer 500 according to an embodiment of the application As shown in FIG. 5, the data buffer 500 comprises two signal paths coupled between a host controller side and a memory module side, respectively via a bidirectional buffer 502 and a data processing module 504. For the path of the bidirectional buffer 502, the received data is not processed but merely buffered. The data processing module 504 comprises an operating unit 506 and a control unit 508, wherein the operating unit 506 further exchanges data with a data processing module of an adjacent data buffer through a BOP interface. Thus, the operating unit 506 can perform a corresponding operation on data based on the control command received by the control unit 508 from the BCOM bus. When the operation needs data of other data buffers, the data processing module 504 can exchange data with adjacent data buffers via the BOP interfaces, wherein the BOP_L interface is for exchanging data with data buffers on the left side, and the BOP_R interface is for exchanging data with data buffers on the right side.

In some embodiments, the bidirectional buffer 502 and the data processing module 504 can be configured with the configuration information stored in the register table.

It should be noted that, the circuit architectures of the central buffer and the data buffers shown in FIG. 4 and FIG. 5 are merely exemplary, and changes can be made to these circuit configurations based on needs in practical applications.

It can be understood that, the memory controllers of the embodiments of the application can be applied in memory devices or systems, and such memory devices and systems can be used in various computer systems.

Figure 1B:
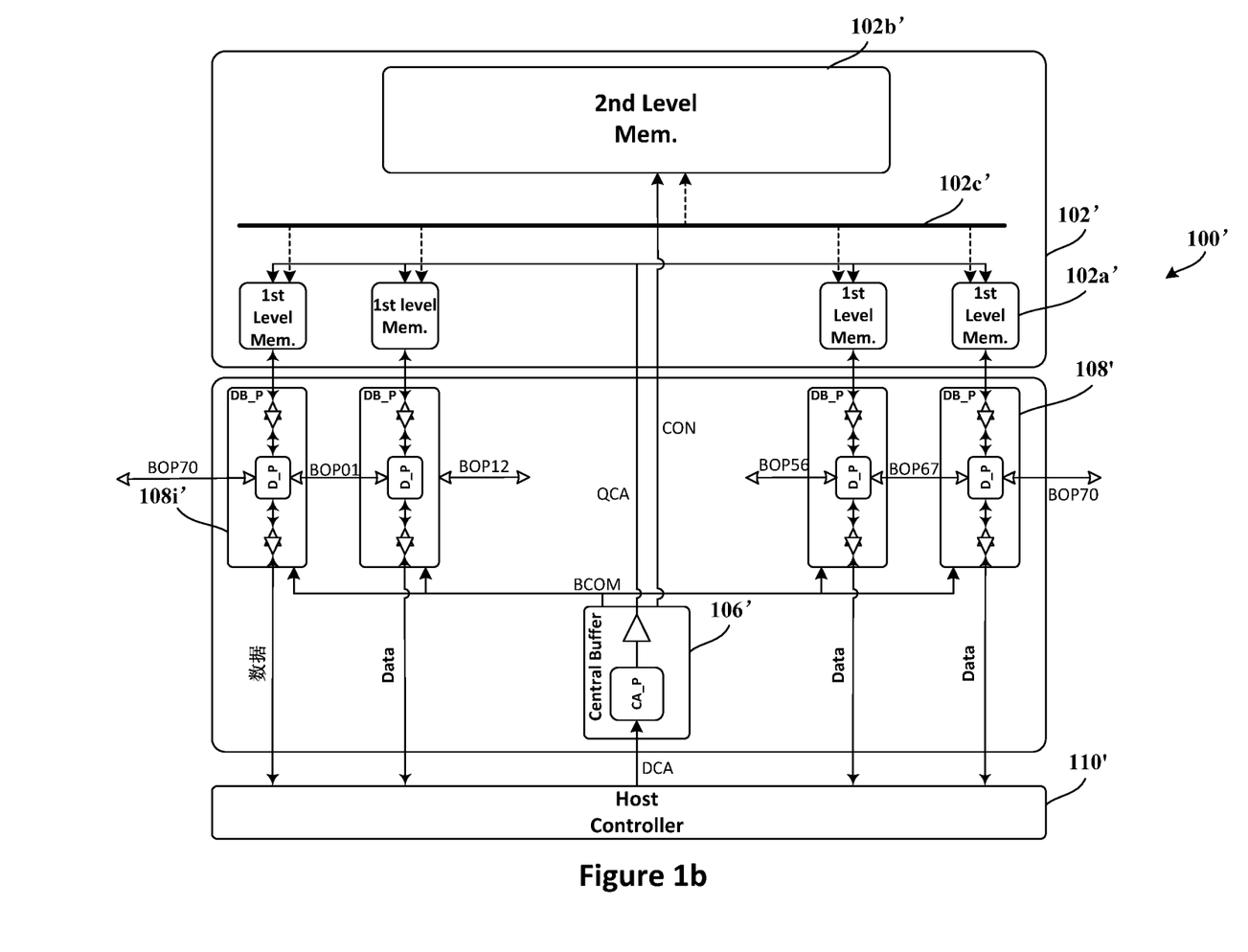
FIG. 1b shows a memory system 100' according to another embodiment of the application.

As mentioned above, the memory controllers in the embodiments of the application can be used in various memory types and structures. FIG. 1b shows a memory system 100' according to another embodiment of the application. The memory system 100' has a structure generally similar to that of the memory system 100 shown in FIG. 1a, differing mainly between their respective memory modules 102 and 102'. In the embodiment shown in FIG. 1b, the memory controller is used with the memory module 102' having two levels of memory submodules. It can be appreciated that, in some embodiments, the memory controller can be used in memory systems with more memory levels. Structures, mechanisms and principles used in the memory system 100' that are similar to those in the memory system 100 shown in FIG. 1a will not elaborated herein.

As shown in FIG. 1b, the memory module 102' includes multiple first level memory submodules 102a', which are coupled to the host controller 110' via respective data buffers 108i' to exchange data therewith. The memory module 102' further includes a second level memory submodule 102b', which is coupled to the multiple first level memory submodules 102a' via the data bus 102c' to exchange data therewith. Moreover, all the first level memory submodules 102a' are coupled to the central buffer 106' via the C/A bus QCA so as to operate under the control of the central buffer 106'. In the embodiment shown in FIG. 1b, the second level memory submodule 102b' is coupled to the central buffer 106' via a separate signal line CON to operate under the control of the central buffer 106'. In some other embodiments, the second level memory submodule 102b' may be coupled to the central buffer 106' via other signal lines, e.g. via the BCOM bus or the C/A bus QCA or a combination of these buses/signal lines. In other words, the memory submodules with different levels can be coupled to the central buffer via the same signal line(s)/bus(es) or different signal lines/buses.

Figure 1C:
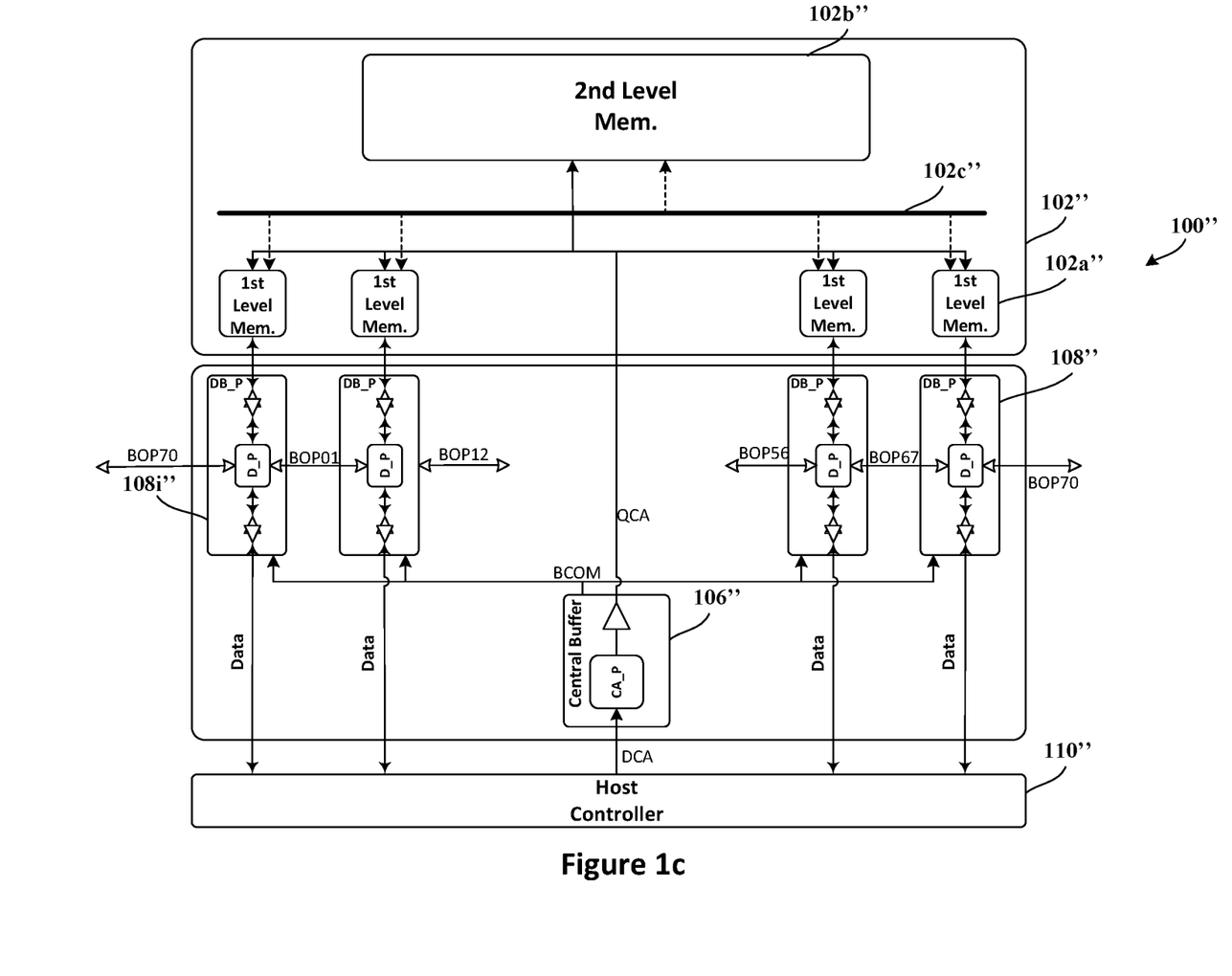
FIG. 1c shows a memory system 100" according to a further embodiment of the application.

FIG. 1c shows a memory system 100" according to a further embodiment of the application. As shown in FIG. 1c, a first level memory submodule 102a" and a second level memory submodule 102b" of a memory module 102" of the memory system 100" are coupled to a central buffer 106" via a C/A bus QCA. The other parts of the memory system 100" shown in FIG. 1c are substantially the same as those of the memory system 100' shown in FIG. 1b, which will not be elaborated herein.

Still referring to FIG. 1b, the first level memory submodule 102a' and the second level memory submodule 102b' may have different memory types. For example, the first level memory submodule 102a' may be a volatile memory while the second level memory submodule 102b' may be a non-volatile memory (e.g. a solid state memory or a magnetic memory). It can be appreciated that the second level memory submodule 102b' shown in the embodiment of FIG. 1b may be a single memory die. In some other embodiments, the second level memory submodule 102b' may include multiple memory dies, and each first level memory submodule 102a' is coupled to one or more memory dies of the second level memory submodule 102b'.

In a write operation, the central buffer 106b' may send a command to indicate first writing data into the first level memory submodule 102a' and then transferring data from the first level memory submodule 102a' to the second level memory submodule 102b'. At this time data is secure. Alternatively, the central buffer 106b' may send a command to indicate first writing data into the first level memory submodule 102a' and then transferring data from the second level memory submodule 102b' to the first level memory submodule 102a' and indicating data storage addresses. At this time data at such storage addresses are secure.

The process for data read operation is similar to that for the write operation, which is not elaborated.

Figure 6:
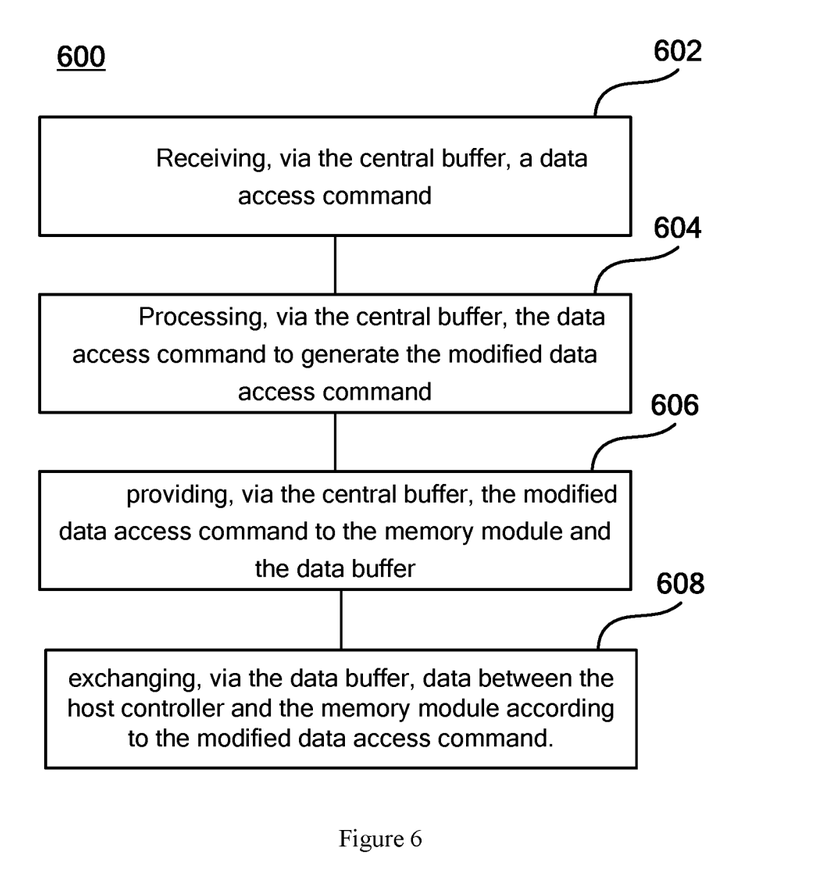
FIG. 6 shows a method 600 for accessing a memory module according to an embodiment of the application.

FIG. 6 shows a method 600 for accessing a memory module according to an embodiment of the application. The method 600 can be executed by, for example, the memory controller shown in FIG. 1a, 1b or 1c.

As shown in FIG. 6, the method 600 may comprise step 602 of receiving a data access command via the central buffer; step 604 of processing the data access command to generate a modified data access command via the central buffer; step 606 of providing the modified data access command to the memory module and the data buffer via the central buffer; and step 608 of exchanging data between the host controller and the memory module according to the modified data access command via the data buffer.

In some embodiments, the step 604 may include: encoding an access address in the data access command such that the modified data access command contains an encoded access address.

In some embodiments, the step 604 may include: processing an access address in the data access command with a predefined address processing algorithm to generate a set of access addresses based on the access address, wherein each access address in the set of access addresses corresponds to a modified data access command.

In some embodiments, the set of access addresses includes multiple consecutive access addresses in an ascending or descending order.

In some embodiments, the set of access addresses includes multiple non-consecutive access addresses at equal intervals or at unequal intervals.

In some embodiments, the modified data access command is of an access type identical to that of the data access command.

In some embodiments, the step 608 may include: receiving data from the memory module, processing the data with a predefined data processing algorithm, and sending the processed data to the memory module via the data buffer according to the modified data access command.

For more details related to the method for accessing the memory module of the embodiments of the application, reference may be made to the foregoing related description about the memory controller and no more description is provided here.

It should be noted that, although several steps of a method for accessing a memory module and various modules or sub-modules of a memory controller are mentioned in the forgoing detailed description, such division is merely exemplary but not mandatory. In fact, according to the embodiments of the application, features and functions of two or more modules described above can be specified in one module. On the contrary, features and functions of one module described above can be further divided into multiple modules to be specified.

Those skilled in the art may understand and implement other variations to the disclosed embodiments from a study of the drawings, the disclosure, and the appended claims. In the claims, the terms "comprise" or "comprising" do not exclude other elements or steps, and the terms "a" or "an" do not exclude a plurality. In practical applications according to the present application, one element may perform functions of several technical features recited in claims. Any reference symbols in the claims should not be construed as limiting the scope.

What is claimed is:

1. A memory controller coupled between a memory module and a host controller to control access of the host controller to the memory module, wherein the memory module comprising one or more of a volatile memory and a non-volatile memory, the memory controller comprising:
a central buffer coupled to the host controller for receiving a data access command from the host controller, and coupled to the memory module for providing a modified data access command to the memory module; wherein the central buffer comprises an access command processing module configured for processing the data access command to generate the modified data access command; and
a data buffer coupled to the central buffer for receiving the modified data access command from the central buffer, and coupled between the host controller and the memory module for exchanging data between the host controller and the memory module under the control of the modified data access command, wherein the data buffer comprises multiple data buffer units all are directly coupled to the central buffer to receive the modified data access command therefrom, and each of the data buffer units comprises a data processing sub-module configured to process at least data buffered by the data buffer unit respectively according to the received modified data access command.

2. The memory controller of claim 1, wherein processing the data access command via the access command processing module comprises: encoding an access address in the data access command such that the modified data access command contains an encoded access address.

3. The memory controller of claim 1, wherein processing the data access command via the access command processing module comprises: processing an access address in the data access command with a predefined address processing algorithm to generate a set of access addresses based on the access address, wherein each access address in the set of access addresses corresponds to a modified data access command.

4. The memory controller of claim 3, wherein the set of access addresses comprises multiple consecutive access addresses in an ascending or descending order.

5. The memory controller of claim 3, wherein the set of access addresses comprises multiple non-consecutive access addresses at equal intervals or at unequal intervals.

6. The memory controller of claim 3, wherein the modified data access command is of an access type identical to that of the data access command.

7. The memory controller of claim 1, wherein the data buffer comprises a data processing module configured for receiving data from the host controller or the memory module, processing the data with a predefined data processing algorithm, and sending the processed data to the host controller or the memory module.

8. The memory controller of claim 1, wherein the data buffer comprises a data processing module configured for receiving data from the memory module, processing the data with a predefined data processing algorithm, and sending the processed data to the memory module.

9. The memory controller of claim 1, wherein processing the data access command via the access command processing module comprises: processing an access address in the data access command with a predefined address processing algorithm to generate a set of access addresses based on the access address, wherein each access address in the set of access addresses corresponds to a modified data access command;
wherein the data buffer comprises a data processing module configured for receiving data from the memory module according to the modified data access command, processing the data with a predefined data processing algorithm, and sending the processed data to the memory module according to the modified data access command.

10. The memory controller of claim 7, wherein the multiple data processing sub-modules are coupled to each other to exchange data between the multiple data buffer units.

11. The memory controller of claim 1, wherein the memory module and the memory controller are in accordance with the JEDEC DDR SDRAM standard, the central buffer is integrated in a registering clock driver, and the registering clock driver is coupled to the data buffer via a data buffer control bus.

12. A memory device, comprising:
a memory module comprising one or more of a volatile memory and a non-volatile memory; and
a memory controller coupled between the memory module and the host controller to control access of the host controller to the memory module, the memory controller comprising:
a central buffer coupled to the host controller for receiving a data access command from the host controller, and coupled to the memory module for providing a modified data access command to the memory module; wherein the central buffer comprises an access command processing module configured for processing the data access command to generate the modified data access command; and
a data buffer coupled to the central buffer for receiving the modified data access command from the central buffer, and coupled between the host controller and the memory module for exchanging data between the host controller and the memory module under the control of the modified data access command, wherein the data buffer comprises multiple data buffer units all are directly coupled to the central buffer to receive the modified data access command therefrom, and each of the data buffer units comprises a data processing sub-module configured to process at least data buffered by the data buffer unit respectively according to the received modified data access command.

13. The memory device of claim 12, wherein the memory module comprises one or more of the following: a flash memory, a magnetoresistive memory, a phase change memory, a resistive memory and a semi-floating gate memory.

14. The memory device of claim 12, wherein the memory module has a multi-level interconnected structure.

15. The memory device of claim 14, wherein the memory module has different levels of memory submodules which are coupled to the central buffer via respective signal lines.

16. A computer system comprising the memory device of claim 12.

17. A method for accessing a memory module, the memory module comprising one or more of a volatile memory and a non-volatile memory, the memory module being coupled to a host controller via a memory controller, the memory controller comprising a data buffer and a central buffer having an access command processing module, wherein the access command processing module is configured for processing a data access command to generate a modified data access command, wherein the data buffer comprises multiple data buffer units all are directly coupled to the central buffer, and each of the data buffer units comprises a data processing sub-module configured to process at least data buffered by the data buffer unit respectively according to the recived modified data access command, the method comprising:
- receiving, via the central buffer, a data access command;
- processing, via the central buffer, the data access command to generate a modified data access command;
- providing, via the central buffer, the modified data access command to the memory module and the data buffer; and
- exchanging, via the data buffer, data between the host controller and the memory module according to the modified data access command.

18. The method of claim 17, wherein the step of processing, via the central buffer, the data access command to generate a modified data access command comprises:
- encoding an access address in the data access command such that the modified data access command contains an encoded access address.

19. The method of claim 17, wherein the step of processing, via the central buffer, the data access command to generate the modified data access command comprises:
- processing an access address in the data access command with a predefined address processing algorithm to generate a set of access addresses based on the access address, wherein each access address in the set of access addresses corresponds to a modified data access command.

20. The method of claim 19, wherein the set of access addresses comprises multiple consecutive access addresses in an ascending or descending order.

21. The method of claim 19, wherein the set of access addresses comprises multiple non-consecutive access addresses at equal intervals or at unequal intervals.

22. The method of claim 19, wherein the modified data access command is of an access type identical to that of the data access command.

23. The method of claim 17, wherein the data buffer comprises a data processing module configured for processing data with a predefined data processing algorithm to generate processed data, the step of exchanging data via the data buffer between the host controller and the memory module according to the modified data access command further comprising:
- receiving data from the memory module, processing the data with a predefined data processing algorithm, and sending the processed data to the memory module according to the modified data access command via the data buffer.

24. The method of claim 17, wherein the memory module comprises one or more of the following: a flash memory, a magnetoresistive memory, a phase change memory, a resistive memory and a semi-floating gate memory.

25. The method of claim 17, wherein the memory module has a multi-level interconnected structure.

26. The method of claim 25, wherein the memory module has different levels of memory submodules which are coupled to the central buffer via respective signal lines.

* * * * *